United States Patent
Kapur et al.

(10) Patent No.: US 7,574,436 B2
(45) Date of Patent: Aug. 11, 2009

(54) RERANKING AND INCREASING THE RELEVANCE OF THE RESULTS OF INTERNET SEARCHES

(75) Inventors: Shyam Kapur, Sunnyvale, CA (US); Jignashu Parikh, Gujarat (IN)

(73) Assignee: Yahoo! Inc., Sunnyvale, CA (US)

( * ) Notice: Subject to any disclaimer, the term of this patent is extended or adjusted under 35 U.S.C. 154(b) by 452 days.

(21) Appl. No.: 11/078,685

(22) Filed: Mar. 10, 2005

(65) Prior Publication Data

US 2006/0206476 A1   Sep. 14, 2006

(51) Int. Cl.
  *G06F 7/00*   (2006.01)
(52) U.S. Cl. ......................................................... 707/5
(58) Field of Classification Search ................. 707/3–5, 707/1; 704/240, 251
  See application file for complete search history.

(56) References Cited

U.S. PATENT DOCUMENTS

| | | | |
|---|---|---|---|
| 6,006,221 A * | 12/1999 | Liddy et al. ..................... | 707/5 |
| 6,006,225 A * | 12/1999 | Bowman et al. ................ | 707/5 |
| 6,169,986 B1 * | 1/2001 | Bowman et al. ................ | 707/5 |
| 6,263,335 B1 * | 7/2001 | Paik et al. ....................... | 707/5 |
| 6,766,320 B1 * | 7/2004 | Wang et al. ..................... | 707/5 |
| 7,010,484 B2 * | 3/2006 | Lin .............................. | 704/240 |
| 2002/0059161 A1 * | 5/2002 | Li ................................. | 707/1 |
| 2003/0014403 A1 * | 1/2003 | Chandrasekar et al. ......... | 707/5 |
| 2003/0083876 A1 * | 5/2003 | Lin .............................. | 704/251 |
| 2003/0163452 A1 * | 8/2003 | Chang et al. .................... | 707/3 |
| 2004/0243568 A1 * | 12/2004 | Wang et al. ..................... | 707/3 |
| 2005/0102251 A1 * | 5/2005 | Gillespie ........................ | 707/1 |
| 2005/0131872 A1 * | 6/2005 | Calbucci et al. ................ | 707/3 |
| 2006/0106769 A1 * | 5/2006 | Gibbs ............................ | 707/3 |

FOREIGN PATENT DOCUMENTS

| | | |
|---|---|---|
| WO | WO 02/48905 A1 | 6/2002 |
| WO | WO 2004/090670 A2 | 10/2004 |
| WO | WO 2004/090670 A3 | 10/2004 |
| WO | WO 2006/062765 A1 | 6/2006 |
| WO | WO 2006/062772 A1 | 6/2006 |

OTHER PUBLICATIONS

"Notification of Transmittal of the International Search Report and the Written Opinion of the International Searching Authority, or the Declaration" received in corresponding International application No. PCT/US2006/008961.

(Continued)

*Primary Examiner*—Hung T Vy
(74) *Attorney, Agent, or Firm*—Hickman Palermo Truong & Becker LLP

(57) ABSTRACT

Techniques are provided for reranking and increasing the relevance of the results Internet searches. A search query is initially parsed into individual units. Each unit corresponds to one or more words that represents a natural concept. A concept network is analyzed to locate concepts that are related to the units in the search query. Particular concepts are selected from the concept network. Independent Internet searches are performed for each of the selected concepts. The search results from these searches are then compared to units in the original search query and ranked according to their relevance to the original search query.

24 Claims, 3 Drawing Sheets

OTHER PUBLICATIONS

European Patent Office, "Notification of Transmittal of the International Preliminary Report on Patentability", International application No. PCT/US2006/008961, dated Jun. 25, 2007, 7 pages.

Claims, International application No. PCT/US2006/008961, 4 pages.

Claims, foreign application No. 200680007639.6, 6 pages.

State Intellectual Property Office of P.R.C., "Notification of The First Office Action (PCT Application Entering National Phase)", Foreign application No. 200680007639.6, received Jan. 23, 2009, 13 pages.

\* cited by examiner

RERANKING AND INCREASING THE RELEVANCE OF THE RESULTS OF INTERNET SEARCHES

RELATED CASES

The present disclosure is related to the following applications:

U.S. patent application Ser. No. 10/712,307, filed Nov. 12, 2003, entitled "Systems and Methods for Search Query Processing Using Trend Analysis" to Kapur;

U.S. patent application Ser. No. 10/713,576, filed Nov. 12, 2003, entitled "Systems and Methods for Generating Concept Units from Search Queries" to Kapur et al.;

U.S. patent application Ser. No. 10/797,614, filed Mar. 9, 2004, entitled "Systems and Methods for Search Processing Using Superunits" to Kapur et al.;

U.S. patent application Ser. No. 10/818,752, filed Apr. 5, 2004, entitled "Universal Search Interface System and Methods" to Kapur;

U.S. patent application Ser. No. 11/006,463, filed Dec. 6, 2004, entitled "Automatice Generation of Taxonomies For Categorizing Queries and Search Query Processing Using Taxonomies" to Kapur et al.;

U.S. patent application Ser. No. 11/006,466, filed Dec. 6, 2004, entitled "Search Processing With Automatic Categorization of Queries" to Kapur et al.; and U.S. patent application Ser. No. 11/077,968, filed Mar. 10, 2005, entitled "System for Modifying Queries Before Presentation to a Sponsored Search Generator or Other Matching System Where Modifications Improve Coverage Without Corresponding Reduction in Relevance" to Kapur et al.

BACKGROUND OF THE INVENTION

The present invention relates to techniques for reranking and increasing the relevance of the results of Internet searches, and more particularly, to techniques for increasing the relevance of Internet search results and reranking the results using a concept network.

With the advent of the Internet and the multitude of web pages and media content available to a user over the World Wide Web (web), a need has developed to provide users with streamlined approaches to filter and obtain desired information from the web. Search systems and processes have been developed to meet the needs of users to obtain desired information. Examples of such technologies can be accessed through Yahoo!, Google and other sites. Typically, a user inputs a query and a search process returns one or more search results (links) related to the query. The search results returned may be very related, or they may be completely unrelated, to what the user was actually looking for. The relatedness of search results to the query may be in part a function of the actual query entered as well as the robustness of the search system (underlying collection system) used.

Human beings do not naturally think in terms of queries. They are an artificial construct imposed on us, in part, by the need to query search engines or look up library catalogs. Human beings do not naturally think in terms of just single words either. What human beings think in terms of are natural concepts.

Search queries usually contain several words that define one or more concepts. Typically, some of the words in a search query are more relevant to defining the concepts than others. A search engine has no way of knowing which words in a search query are most relevant to the user's intent. As a result, search engines typically turn up many search results that are not relevant to the user's intent.

Search engines typically rank search results according to their relevance to the search query. Search queries often contain superfluous terms which cause the search engine to return irrelevant search results. Often the search engine ranks the irrelevant search results highly within the list of search results.

It would be desirable therefore to provide Internet searching techniques for increasing the relevance of the search results to the user's original intent.

BRIEF SUMMARY OF THE INVENTION

The present invention provides techniques for increasing the relevance of Internet search results to a user's intent. The present invention also provides techniques for reranking the search results of a search query by determining the relevancy of the search results to units, unit associations, and unit extensions in the search query.

A search query is initially parsed into individual units. Each unit corresponds to one or more words that represents a natural concept. Associated units are two or more units that come together in a search query, but are not sufficiently related to form a new unit. Extension units are two or more units that come together in a search query and are sufficiently related to form a new unit.

The present invention analyzes a concept network to locate concepts that are related to the units in a search query. The concept network links concepts that are related to each other. Particular concepts are selected from the concept network based on their relationships to units in the query.

According to one embodiment, the concepts are selected from the concept network based on how frequently the concepts appeared in previously submitted search queries. Concepts that appeared more frequently in previous search queries are chosen from among the concepts selected from the concept network. Individual Internet searches are performed for one or more of the related concepts selected from the concept network.

The search results from each of the individual searches are compared to the search query and sorted according to their relevance to the query. The search results can be sorted based on their relevance to units, associated units, and extension units in the original search query.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1A:
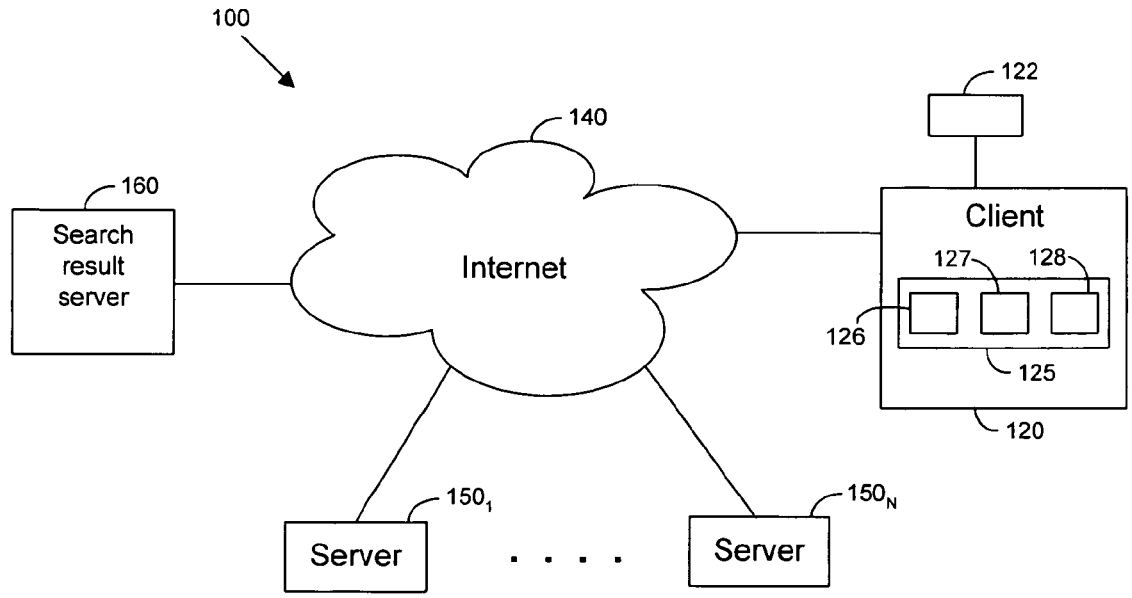
FIG. 1A is a diagram of an Internet communications system that can implement embodiments of the present invention.

FIG. 1A illustrates a general overview of an information retrieval and communication network 100 including a client system 120 according to an embodiment of the present invention. In computer network 100, client system 120 can communicate through the Internet 140, or other communication network, e.g., over any LAN or WAN connection, with a plurality of server systems $150_1$ to $150_N$. For example, client system 120 can communicate with search result server 160. As described herein, client system 120 is configured according to the present invention to communicate with any of server systems $150_1$ to $150_N$ and 160, e.g., to access, receive, retrieve and display media content and other information such as web pages and web sites.

Several elements in the system shown in FIG. 1A include conventional, well-known elements that need not be explained in detail here. For example, client system 120 could include a desktop personal computer, workstation, laptop, PDA, cell phone, or any WAP-enabled device or any other computing device capable of interfacing directly or indirectly to the Internet. Client system 120 typically runs an HTTP client, e.g., a browsing program, such as Microsoft's Internet Explorer™ browser, Netscape Navigator™ browser, Mozilla™ browser, Opera browser, or a WAP-enabled browser in the case of a cell phone, PDA or other wireless device, or the like, allowing a user of client system 120 to access, process and view information and pages available to it from server systems $150_1$ to $150_N$ over Internet 140.

Client system 120 also typically includes one or more user interface devices 122, such as a keyboard, a mouse, touch-screen, pen or the like, for interacting with a graphical user interface (GUI) provided by the browser on a display (e.g., monitor screen, LCD display, etc.), in conjunction with pages, forms and other information provided by server systems $150_1$ to $150_N$ or other servers. The present invention is suitable for use with the Internet, which refers to a specific global internetwork of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 120 and all of its components are operator configurable using an application including computer code run using a central processing unit such as an Intel Pentium™ processor, AMD Athlon™ processor, or the like or multiple processors. Computer code for operating and configuring client system 120 to communicate, process and display data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, a digital versatile disk (DVD) medium, a floppy disk, and the like.

Additionally, the entire program code, or portions thereof, may be transmitted and downloaded from a software source, e.g., from one of server systems $150_1$ to $150_N$ to client system 120 over the Internet as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a client system such as, for example, in C, C+, HTML, XML, Java, JavaScript, any scripting language, such as VBScript. In some embodiments, no code is downloaded to client system 120, and needed code is executed by a server, or code already present at client system 120 is executed.

According to one embodiment, a client application (represented as module 125) executing on client system 120 includes instructions for controlling client system 120 and its components to communicate with server systems $150_1$ through $150_N$ and 160 and to process and display data content received therefrom. Additionally, client application module 125 includes various software modules for processing data and media content. For example, application module 125 can include one or more of a search module 126 for processing search requests and search result data, a user interface module 127 for rendering data and media content in text and data frames and active windows, e.g., browser windows and dialog boxes, and an application interface module 128 for interfacing and communicating with various applications executing on client 120. Further, interface module 127 can include a browser, such as a default browser configured on client system 120 or a different browser.

According to one embodiment, search result server 160 is configured to provide search result data and media content to client system 120, and server systems 150 are configured to provide data and media content such as web pages to client system 120, for example, in response to links selected in search result pages provided by server system 160. Server system 160 in one embodiment references various collection technologies for collecting information from the World Wide Web and for populating one or more indexes with, for example, pages, links to pages, etc. Such collection technologies include automatic web crawlers, spiders, etc., as well as manual or semi-automatic classification algorithms and interfaces for classifying and ranking web pages within an hierarchical structure. In certain aspects, server 160 is also configured with search related algorithms for processing and ranking web pages, such as for example, the PageRank algorithm from Google. Server 160 is also preferably configured to record search queries in the form of query log files.

Server system 160, in one aspect, is configured to provide data responsive to various search requests received from a client system, in particular search module 126. Server systems 150 and 160 can be part of a single organization, e.g., a distributed server system such as that provided to users by Yahoo! Inc., or they can be part of disparate organizations. Server systems 150 and server system 160 each includes at least one server and an associated database system, and may include multiple servers and associated database systems, and although shown as a single block, may be geographically distributed. For example, all servers of server system 160 can be located in close proximity to one another (e.g., in a server farm located in a single building or campus), or they may be distributed at locations remote from one another (e.g., one or more servers located in city A and one or more servers located in city B). As used herein, the term "server system" will typically include one or more logically and/or physically connected servers distributed locally or across one or more geographic locations. Additionally, the term "server" typically includes a computer system and an associated storage system and database application as is well known in the art. The terms "server" and "server system" will be used interchangeably herein.

According to one embodiment, server 160 includes algorithms that provide search results to users in response to search queries received from client system 120. According to an embodiment of the present invention, server system 160 is configured to increase the relevance search queries received from client system 120, as discussed in detail below.

Figure 1B:
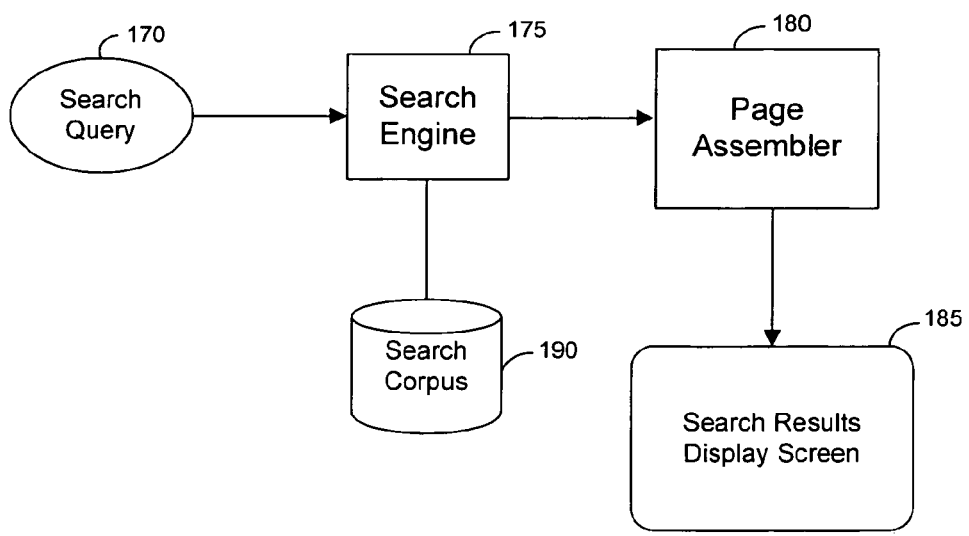
FIG. 1B is a diagram of a Internet search system that can implement embodiments of the present invention.

FIG. 1B illustrates an overview of an Internet searching system that implement embodiments of the present invention. A search query 170 is transmitted to a search engine 175 to initiate an Internet search (e.g., a web search). Search engine 175 locates web content matching search query 170 from search corpus 190. Search corpus 190 represents content that is accessible via the World Wide Web, the Internet, intranets, local networks, and wide area networks.

Search engine 175 retrieves content from search corpus 190 matching search query 170 and transmits the matching content (i.e., search results) to page assembler 180. Page assembler 180 sorts the search results according to their relevance to the search query and assembles the results in an order that can be easily displayed to a user. The most relevant search results are displayed to a user in search result display screen 185.

Figure 2:
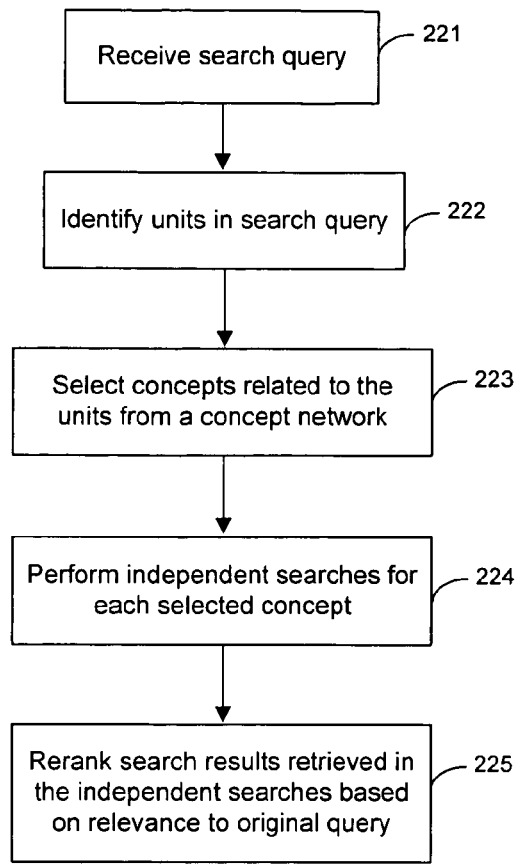
FIG. 2 is a flow chart that illustrates a methodology for increasing the relevance of Internet search results according to an embodiment of the present invention.

The present invention provides techniques for increasing the relevance of Internet search results to a user's intent. FIG. 2 illustrates an example of a methodology according to an embodiment of the present invention. It should be understood that the specific steps shown in FIG. 2 are not intended to limit the scope of the present invention. Numerous modifications to the methodology of FIG. 2 are within the scope of the present invention.

The user can initiate an Internet search (e.g., a web search) by entering a search query. A system of the present invention receives a search query from a user at step 221 as shown in FIG. 2. The search query is then parsed into units at step 222.

Search queries can be decomposed into constituent parts referred to as units. A query processing engine decomposes a search query into units using statistical methods. A unit is one or more word sequences that typically corresponds to a natural concept such as "New York City" or "bird of prey." Further details of techniques for generating concept units from search queries are discussed in co-pending and commonly-assigned U.S. patent application Ser. No. 10/713,576, filed Nov. 12, 2003, to Shyam Kapur, which is incorporated by reference herein.

A concept network is a construct that illustrates relationships between related concepts. Each unit in a search query is located in a concept network. A concept network is used to identify concepts that are related to the search query units. After a search query unit has been located in a concept network, concepts in the concept network that are related to the unit are selected at step 223.

A concept network can be link related concepts using a number of techniques. According to one embodiment of the present invention, a concept network links concepts that are synonyms, concepts that have a more specific meaning, concepts that have a more general meaning, specific real-life examples of the concept, and well-known terms or names that sound similar to the concept or use some of the same words.

Figure 3A:
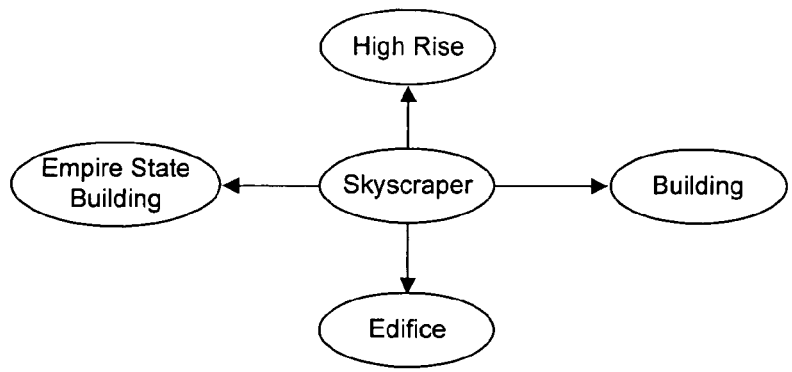
FIGS. 3A-3D illustrate examples of concept networks that can be used to process search queries according to the present invention.

Using the example shown in FIG. 3A, if a unit in a search query is skyscraper, the system locates the concept "skyscraper" in the concept network and identifies the related concepts. FIG. 3A illustrates an example of a concept network for skyscraper. In this concept network, the concept "skyscraper" is linked to more general terms such as "building" and "edifice." Skyscraper is also linked to a similar term "high rise" and a famous example of a skyscraper "Empire State Building."

According to another embodiment, search queries that have been previously submitted are analyzed to determine how frequently the related concepts in the concept network appeared together in the previously submitted search queries. A concept network can be built by linking concepts that have appeared together in previously submitted search queries. At step 223, related concepts are selected in a concept network that appeared together most frequently in previously submitted search queries. All previously submitted search queries are stored in memory for analysis.

A concept network can be based on concepts that appeared together in queries submitted by all users. As another example, the concept network, or any portion thereof, can be a session based concept network linking concepts that appeared together in search queries submitted by one particular user (or a group of users). The related concepts that appeared together most frequently in the previously submitted search queries are selected at step 223.

Figure 3B:
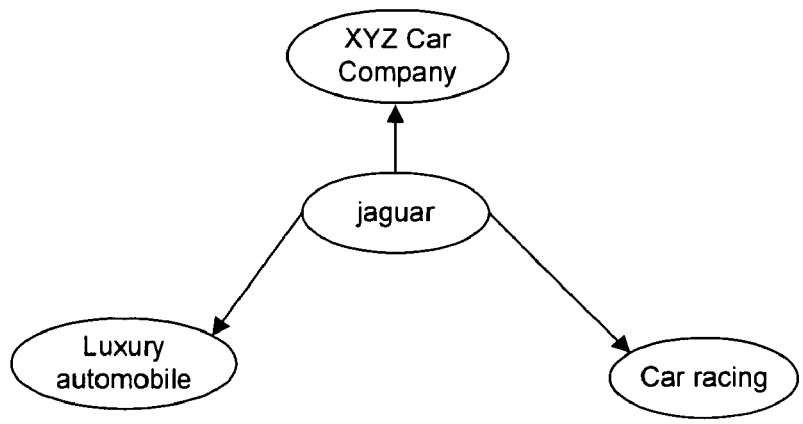

FIG. 3B illustrates an example of a session based concept network. In FIG. 3B, the main concept "jaguar" is linked to the related concepts "luxury automobile," "XYZ Car Company," and "car racing," because a particular user has submitted queries in the past that have linked "jaguar" to car related concepts. A different user, for example, may have submitted prior queries that indicate he is interested in jaguar animals. For this user, the present invention creates a different concept network that links "jaguar" to animal related concepts such as cat, zoo, or safari.

Figure 3C:
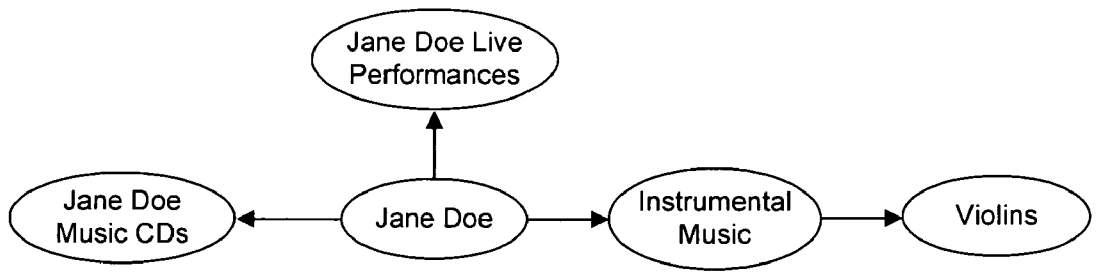

According to another embodiment of the present invention, a concept network can link concepts that appeared together most frequently in previous queries submitted during a specified time period by one or more users. FIG. 3C illustrates an example of a time limited concept network. In this example, a concept "Jane Doe" is linked to the related concepts "Jane Doe Live Performances," "Jane Doe Music CDs," and "instrumental music." These related concepts are the concepts that appeared most frequently with "Jane Doe" in previous search queries over a specified time interval. The specified time interval can be, for example, the past 24 hours, the past week, or the past month.

Figure 3D:

In the example of FIG. 3C, the concept network is based on concepts related to a singer named Joe Doe based on the most popular search queries in the past 24 hours. During a subsequent 24 hour period, the most popular search queries including "Jane Doe" may relate to a politician with the same name. FIG. 3D illustrates how the concept network for "Jane Doe" is changed to include links to the related concepts "Jane Doe US Senator" and "Doe Initiative." The concept network is updated to include concepts that appeared most frequently in recent queries with the unit "Jane Doe."

According to an embodiment of the present invention, the most closely related concepts from the concept network are selected. The most closely related concepts can be, for example, all concepts that are directly linked to the main concept in the concept network. Other concepts can be linked to the main concept indirectly through one of the directly linked concepts. FIG. 3C illustrates an example of an indirect connection between the concepts "Jane Doe" and "violins" through "instrumental music."

FIGS. 3A-3D illustrate just a few examples of the relationships that link concepts in a concept network. These examples are provided for illustrative purposes only and are not intended to limit the scope of the present invention. Many other relationships between concepts in a concept network are possible.

The selection process performed at step 223 can be based on any arbitrary criteria. For example, the top five most frequently occurring related concepts from the concept network can be selected at step 223. As another example, the top 50% or the top 25% of the most frequently occurring related concepts can be selected at step 223. Many other selection techniques can be used according to the present invention. The examples discussed herein are provided to illustrate the principles of the present invention and are not intended to limit the scope of the present invention.

At step 224, independent Internet searches (e.g., web searches) are performed for one or more of the related concepts selected at step 223. For example, if there are four units in a search query, and one related concept is selected for each unit at step 223, four independent Internet searches are performed at step 224. According to one embodiment, if a large number of related concepts are selected at step 223, Internet searches are performed for only a subset of the concepts. For example, if 20 concepts are selected at step 223, Internet searches are performed for only the top 5 concepts that are related to all of the units in a search query.

Search engine 175 can perform the independent Internet searches for the concepts selected at step 223. The Internet searches can be performed using any well-known Internet searching techniques (e.g., using Google or Yahoo! search technology).

Separate sets of search results are retrieved for each of the individual Internet searches performed by search engine 175 at step 224. Search engine 175 typically sorts the search results for each of the Internet searches according to their relevance to each related concept.

At step 225, the present invention reranks the search results retrieved from the Internet searches performed at step 224. The search results retrieved from Internet searches can be grouped with search results that are retrieved from an Internet search performed on the entire original search query.

Each of the search results are compared to the units, unit associations, and unit extensions in the original search query. Each search result is assigned a rank or score based on its relevance to the original search query.

The relevance of the search results to the original search query can be determined by comparing units, associated units, and extension units in the query to the search results. Associated units are two or more units that come together in a search query, but are not sufficiently related to form a new unit. Extension units are two or more units that come together in a search query and are sufficiently related to form a new unit.

The search results are analyzed to determine how often the units, the associations of units, and the unit extensions from the search query appear in the search results. The search results are assigned a new score based on the frequency (or relative frequency) that instances of the units, the associated units, and/or the extension units appear in the search results. Search results that contain more instants of the units, the associated units, and/or the extension units are given a higher score.

According to an embodiment of the present invention, the search results retrieved in the Internet searches are reranked. According to the reranking process, a rerank score is assigned to each of the search results. The rerank score can be calculated, for example, by multiplying the original rank score assigned by search engine 175 by the new score calculated based on the frequency of query units, associated units, and extension units in the search results. The search results are then sorted based on the rerank score.

Search results received from certain types of search queries can be given higher scores at step 225. For example, search results retrieved from navigational queries can be ranked more highly than search results retrieved from other types of queries. The higher scores given to navigational queries are based on a recognition that navigational queries generally retrieve more relevant search results.

Once rerank scores have been assigned to each of the search results based on their relevance to the original search query, the search results are sorted from highest rerank scores to lowest rerank scores at step 225. The highest rerank scores represent the content that is most relevant to the original search query, and the lowest rerank scores represent the content that is least relevant to the original search query.

The present invention increases the relevance of search results that are retrieved from Internet searches by locating content that matches concepts related to units in the search query. The concepts are selected from a concept network as discussed above. The search results are then combined with search results from a standard Internet search based on the entire search query and sorted according to their relevance to the search query.

By increasing the number of search results using the concept network, at least some of the search results are likely to be highly relevant to the search query and to the user's intent no matter what the user's intent is. Because the search results are sorted based on relevance to the query, the most relevant results are displayed first. Using these techniques, the present invention is able to identify a larger number of relevant search results.

As has now been described, methods and apparatus can be provided to increase relevance of search results. Improvements in search relevance provide a more effective search engine, as a goal is to find what users are searching for. i.e., finding results that are relevant to what the user wants to find even when the query presented by the user is somewhat different. Many approaches to improving relevance have been tried, but typically fail. One aspect of improving relevance may turn out to involve the details of a feedback loop identifying what the users want from user actions and feeding that back to a relevance engine.

In one approach described herein, relevance is determined using a units approach. Since units are atomic constituents or concepts in user queries, they can be used for relevance determinations. Units can be generated from search query logs through an automated statistical approach. Units can be used to generate sets of "related searches" that users might find more relevant than the search queries they are using.

Related searches can be refinements on units expressed in a user's query. For example. the related searches for the unit "party" might include (in order of their frequencies) "party rentals", "party supplies", "birthday party", "political party", "party pics", "party games", "party poker", "party city", and so on. As illustrated by the related searches, the unit "party" is an ambiguous concept, as it can refer to a political unit and an event or occasion. There are also other interpretations, as in a group of people and a person/institution involved in legal proceedings. By presenting related searches and monitoring user selections among the related searches, the search engine can determine the exact or most frequent sense or intent when a user types in such ambiguous queries as well as determining when a particular concept changes meaning. For example, immediately before a big election "party" more often refers to political parties, whereas near holidays, "party" more often refers to celebration events. Such changes can be detected by user click-throughs of related searches.

Systems described herein uses the related search click-throughs to improve the relevance with a variety of processes, such as implicit reranking, explicit interleaving, CTR (click-through rate) based interleaving, association of searches to search results, and the like.

For implicit reranking, the search engine examines the original query, Q, and its first K (typically K=5) related searches and merges (and re-ranks) the results based on occurrences of the first M (typically M=20) related searches in the title and abstracts of the search results. A variant of this process uses actual documents corresponding to the search results, which is a bit computationally expensive. However, it can be used for some specific queries for which results can be pre-generated periodically in advance, such as every week or every day. These queries can be those which are news-related or ambiguous where it is expected that the search engine would not do a good job of providing relevant results.

For explicit interleaving, the original search engine results are not reordered, but related search results are interleaved. For example, the highest rank result from each of the related searches might be interleaved at every Xth (typically 4th or 5th) result position in the original search results. For example, one result set might look like:

1. Search result #1
2. Search result #2
3. . . . .
4. . . . .
5. Related Search A, search result #1
6. Search result #5
7. Search result #6
8. . . . .
9. . . . .
10. Related Search B, search result #2

This method introduces relevant results missing in the top N results for the original search results, and also adds variety to the result set. Of course, as high ranking related search results are inserted, results towards the end of the main result set are effectively demoted. Where a results page shows a limited number of hits, some hits fall off the first page of results.

With CTR based interleaving, the click logs are examined in selecting which search results are to fall off the page. Results that have a less than an expected CTR value are replaced with the related search results.

With an associating approach, related searches are associated to web search results. Related search(es) are related to a web result based on some definition of relatedness. One such definition is that a related search is added to a search result if the first result of the related search is same as this particular search result.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiments disclosed, but that the invention will include all embodiments and equivalents falling within the scope of the claims.

What is claimed is:

1. A method for increasing the relevance of search results retrieved from searches, the method comprising the machine-implemented steps of:

identifying one or more units in a search query, wherein each of the one or more units corresponds to one concept in the search query;

selecting one or more concepts in a concept network that are related to the one or more units in the search query, wherein the concept network comprises a plurality of concepts;

wherein selecting the one or more concepts includes determining how frequently a subset of the plurality of concepts appeared in previous search queries that were submitted by a plurality of users, wherein the one or more concepts appeared more frequently in the previous search queries relative to other concepts in the concept network;

using the search query to perform a search;

sorting search results retrieved from the search based on a relevance of the search results to the search query, wherein each of the search results includes a title and an abstract of the search result; and reranking the search results based on occurrences of the one or more concepts in the title or abstract of the each of the search results.

2. The method according to claim 1 wherein selecting one or more of the related concepts from the concept network further comprises:

selecting a predetermined number of the related concepts from among the concepts in the concept network that are most related to the one or more units.

3. A volatile or non-volatile memory medium storing program code that, when executed by one or more processors, causes the one or more processors to perform the steps recited in claim 2.

4. The method according to claim 1 wherein selecting one or more of the related concepts from the concept network further comprises:

selecting all of the related concepts that are directly linked to the one or more units in the concept network.

5. A volatile or non-volatile memory medium storing program code that, when executed by one or more processors, causes the one or more processors to perform the steps recited in claim 4.

6. The method according to claim 1 wherein selecting one or more of the related concepts from the concept network further comprises:

selecting the related concepts in the concept network that are synonyms of the one or more units.

7. A volatile or non-volatile memory medium storing program code that, when executed by one or more processors, causes the one or more processors to perform the steps recited in claim 6.

8. The method according to claim 1 wherein sorting the search results retrieved from the search further comprises:

assigning a rerank score to each of the search results based on how frequently the one or more units in the search query appear in each of the search results.

9. The method according to claim 8 wherein the rerank scores each include a contribution from a rank score assigned by a search engine that performs the searches for each of the related concepts.

10. A volatile or non-volatile memory medium storing program code that, when executed by one or more processors, causes the one or more processors to perform the steps recited in claim 9.

11. A volatile or non-volatile memory medium storing program code that, when executed by one or more processors, causes the one or more processors to perform the steps recited in claim 8.

12. The method according to claim 1 wherein sorting the search results retrieved from the search further comprises:
assigning a rerank score to each of the search results based on how frequently the one or more units, associated units, and extension units in the search query appear in each of the search results.

13. The method according to claim 12 wherein sorting the search results retrieved from the search further comprises:
sorting the search results based on values of the rerank scores.

14. The method according to claim 13 wherein sorting the search results retrieved from the search further comprises ranking navigational queries more highly than search results retrieved from other types of queries.

15. A volatile or non-volatile memory medium storing program code that, when executed by one or more processors, causes the one or more processors to perform the steps recited in claim 14.

16. A volatile or non-volatile memory medium storing program code that, when executed by one or more processors, causes the one or more processors to perform the steps recited in claim 12.

17. A volatile or non-volatile memory medium storing program code that, when executed by one or more processors, causes the one or more processors to perform the steps recited in claim 13.

18. A volatile or non-volatile memory medium storing program code that, when executed by one or more processors, causes the one or more processors to perform the steps recited in claim 1.

19. A method for increasing the relevance of search results retrieved from searches, the method comprising the machine-implemented steps of:
identifying one or more units in a search query;
selecting one or more concepts in a concept network that are related to the one or more units in the search query, wherein the concept network comprises a plurality of concepts;
wherein selecting the one or more concepts includes determining how frequently a subset of the plurality of concepts appeared in previous search queries that were submitted by a plurality of users, wherein the one or more concepts appeared more frequently in the previous search queries relative to other concepts in the concept network;
using the search query to perform a first search to retrieve a first plurality of search results;
using at least one of the one or more concepts to perform a second search to retrieve a second plurality of search results; and
interleaving one or more of the second plurality of search results into the first plurality of search results.

20. The method of claim 19, wherein:
a result set is a set of search results that will be displayed to a user;
the result set comprises at least a subset of the first plurality of search results and the one or more of the second plurality of search results;
the one or more of the second plurality of search results are one or more particular search results;
interleaving the one or more of the second plurality of search results into the first plurality of search results includes positioning the one or more particular search results at one or more pre-determined positions in the result set;
at least one of the first plurality of search results, when displayed to the user, appears above at least one of the one or more particular search results; and
at least one of another of the first plurality of search results, when displayed to the user, appears below the at least one of the one or more particular search results.

21. A volatile or non-volatile memory medium storing program code that, when executed by one or more processors, causes the one or more processors to perform the steps recited in claim 20.

22. A volatile or non-volatile memory medium storing program code that, when executed by one or more processors, causes the one or more processors to perform the steps recited in claim 19.

23. A method for increasing the relevance of search results retrieved from searches, the method comprising the machine-implemented steps of:
identifying one or more units in a search query;
selecting one or more concepts in a concept network that are related to the one or more units in the search query, wherein the concept network comprises a plurality of concepts;
wherein selecting the one or more concepts includes determining how frequently a subset of the plurality of concepts appeared in previous search queries that were submitted by a plurality of users, wherein the one or more concepts appeared more frequently in the previous search queries relative to other concepts in the concept network;
using the search query to perform a search to retrieve a first plurality of search results;
using at least one of the one or more concepts to perform a second search to retrieve a second plurality of search results;
determining a click-through rate for each of the first plurality of search results; and
in response to determining that one or more first search results of the first plurality of search results are associated with a lower click-through rate relative to the other search results of the first plurality of search results:
excluding the first one or more search results from a search result set that will be displayed in a search results page, and
replacing, in the search result set, the first one or more search results with one or more search results of the second plurality of search results.

24. A volatile or non-volatile memory medium storing program code that, when executed by one or more processors, causes the one or more processors to perform the steps recited in claim 23.

* * * * *